United States Patent [19]

Alexander

[11] Patent Number: 5,230,017
[45] Date of Patent: Jul. 20, 1993

[54] COMMUNICATION LINE MONITORING SYSTEM

[75] Inventor: Robert C. Alexander, Columbia, Va.

[73] Assignee: British Technology Group USA, Gulph Mills, Pa.

[21] Appl. No.: 789,689

[22] Filed: Nov. 8, 1991

[51] Int. Cl.⁵ ................. H04M 15/00; H04M 15/08
[52] U.S. Cl. ................................. 379/140; 379/113; 379/164
[58] Field of Search ............... 379/113, 165, 164, 377, 379/383, 133, 140

[56] References Cited
U.S. PATENT DOCUMENTS
4,559,416  12/1985  Theis et al. .................... 379/34

Primary Examiner—Stafford Schreyer
Attorney, Agent, or Firm—Fitzpatrick, Cella, Harper & Scinto

[57] ABSTRACT

One or more lines of a communication terminal are monitored to determine blocked calls by detecting times of incoming calls. A signal corresponding to the pattern of incoming calls is generated from the detected times. After detection of the starting time of an all lines are busy state, an estimate of blocked calls is formed from the incoming call pattern signal and the detected start of the all lines are busy state.

53 Claims, 8 Drawing Sheets

COMMUNICATION LINE MONITORING SYSTEM

FIELD OF THE INVENTION

The invention relates to monitoring of communication lines and, more particularly, to communication line monitoring arrangements adapted to determine blocked calls to a communication terminal.

BACKGROUND OF THE INVENTION

As is well known in the art, monitoring communication parameters such as the number of incoming and outgoing calls, holding time and lost calls at a communication terminal is needed to properly manage terminal operations. While the information required for evaluating the operating condition of a communication terminal is available at a switching center to which the lines of the terminal are connected, access to such information may involve long delays. In order to improve efficiency and reduce cost, monitoring devices to automatically observe and record the activity of lines at a communication terminal have been employed. With the line monitoring devices, the condition of the terminal and the communication line traffic may be ascertained in a timely fashion without requiring access to a switching center for information.

U.S. Pat. No. 4,712,230 issued Dec. 8, 1987 to J. E. Rice et al., for example, discloses a programmable monitoring and recording apparatus usable with any desired telephone set up in which an off-hook detector and a line status unit provide line status signals to an indicator panel. The monitoring and recording apparatus is connected in parallel with one or more telephones to record in memory and print out, for each detected call, information such as the number dialed, the time, date and duration of call, the station originating the call, the number of rings, whether destination busy and whether there was voice communication. The recorded information on the operation of the telephone set up permits adjustment and modification that improve telephone service on reviewing the recorded information in a timely manner.

U.S. Pat. No. 4,270,024 issued May 26, 1981 to P. Theis et al. discloses a telephone line activity monitor that utilizes a dedicated computer to tabulate line traffic parameters. The monitor computer is adapted to store and display preselected parameters as histograms and to discriminate between incoming and outgoing calls based on the presence or absence of a ring prior to a line going off-hook. Ringing is recognized by measuring the frequency of major fluctuations in the signal on the T-R pair of a telephone line.

Neither of the foregoing automatic monitoring arrangements that acquire information from the lines of a communication terminal detects or determines incoming calls to a communication terminal that are lost due to all lines of the terminal being in a busy state. Such lost calls are blocked at a switching center which may be remotely located in a telephone central office. As a result, there is no indication of the blocked calls on the lines of the communication terminal. Such information on blocked calls may be obtained from the connected switching center by manual inquiry or through the use of relatively expensive and complex circuit connections.

Soviet Union patent Document 1192162 dated Nov. 15, 1982 discloses switching apparatus that monitors lost telephone calls by measuring the number of calls being serviced on every occasion when a call loss is determined. The loss criterion is calculated at the end of a prescribed time interval as a function of the number of calls at the time of each call loss and the number of call losses. The arrangement provides automatic monitoring of the condition of a system and measurement of the statistical characteristics of telephone call transmission. Accuracy is improved by taking into account all calls in analysis. The monitoring requires detection of lost calls. As aforementioned, such lost call information is available at switching centers but cannot be obtained by monitoring telephone lines.

Thus, it is a problem of communication terminal management that blocked call information is not available in a timely fashion and that blocked call information is not available through automatic monitoring of communication terminal lines.

BRIEF SUMMARY OF THE INVENTION

It is an object of the present invention to provide information on blocked calls to a communication terminal by automatic monitoring of the lines of the terminal.

It is another object of the invention to provide an estimate of block calls in a communication terminal using a calling pattern of incoming calls to monitored lines of a communication terminal.

The invention is directed to a communication system having at least one communication line in which the times of incoming calls are detected and a signal corresponding to a calling pattern of incoming calls is generated from the detected incoming call times. The starting time of a state in which all communication lines are busy is detected and an estimate of incoming call blockage is formed on the basis of the busy state starting time and the calling pattern signal.

According to one aspect of the invention, the times of incoming calls are detected over a prescribed time interval and the calling pattern signal is formed from the times of incoming calls over the prescribed time interval.

According to another aspect of the invention, the prescribed time interval is related to the holding times of incoming calls.

According to yet another aspect of the invention, the calling pattern signal corresponds to the times successive incoming calls are initiated over the prescribed time interval.

According to yet another aspect of the invention, the calling pattern signal corresponds to a statistical parameter related to difference between the times at which successive incoming calls are initiated over the prescribed time interval.

According to yet another aspect of the invention, a signal representing an estimate of blocked calls is formed by combining the difference between the time at which at least one communication line is released from its busy state after all communication lines have been in the busy state and the starting time of the state in which all communication lines are busy with the calling pattern signal.

According to yet another aspect of the invention, an alarm signal is generated on the basis of the start time of the all lines are busy state and calling pattern signal for incoming calls.

According to yet another aspect of the invention, an alarm signal is generated when the average time difference between initiation of successive incoming calls over the prescribed time interval elapses subsequent to the starting time of the all lines are busy state.

In an embodiment illustrative of the invention, lines of a communication terminal are periodically scanned through line monitoring interface circuits to detect line hook states. The line hook states are stored and times at which incoming calls on selected lines are initiated are detected in a signal processor from the stored line hook states. When the start of an all lines are busy state is detected by processor analysis of stored line hook states, a signal corresponding to the average of differences in initiation times of successive calls over a prescribed time interval is formed. An alarm is set upon elapse of average initiation time difference subsequent to the start of the all lines busy state. Upon determination of the termination of the all lines busy state in the processor when a line goes on hook, a signal corresponding to an estimate of blocked calls is generated on the basis of the period of the all lines are busy state and the average difference in incoming call initiation times over the prescribed time interval.

The invention will be better understood from the following more detailed description taken with the accompanying drawings and claims.

DETAILED DESCRIPTION

Figure 1:
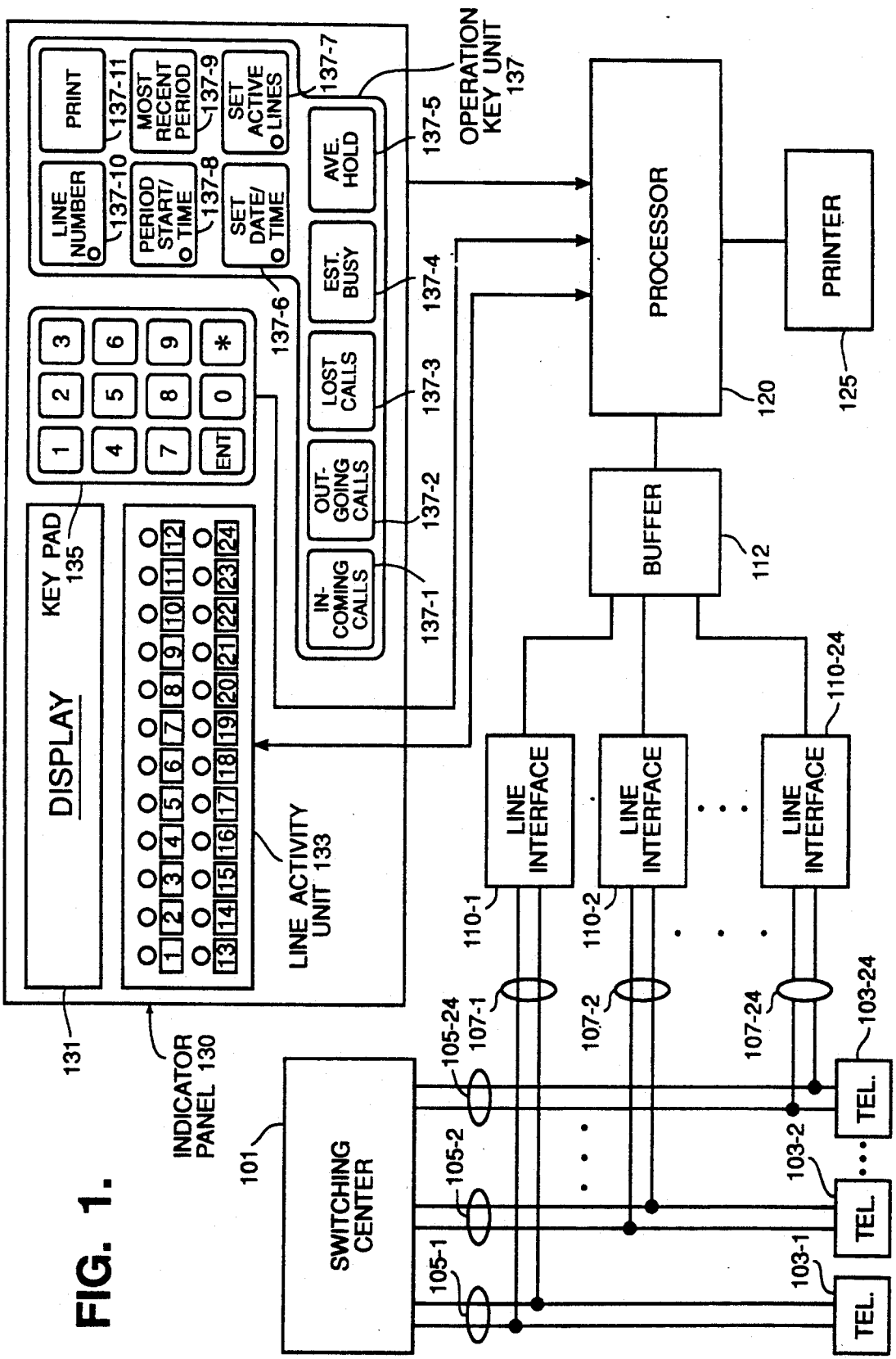
FIG. 1 is a block diagram of an embodiment of an automatic monitoring system for a communication terminal that is illustrative of the invention.

FIG. 1 is a general block diagram of an automatic monitoring system illustrative of the invention. For purposes of illustration, it is assumed that a 24 line telephone system is monitored. It is to be understood, however, that telephone systems having a different number of telephones, communication systems with telephones and data units such as facsimile devices or modems, or other types of communication systems may be monitored in accordance with the invention.

Referring to FIG. 1, there is shown a switching center 101 which may be a remotely located centrex, telephone lines 105-1 to 105-24, telephones 103-1 to 103-24, line interface circuits 110-1 to 110-24, a buffer 112 to isolate line interface circuits 110 to 110-24, a processor 120 which may comprise a Z-80 microprocessor or other microprocessor and associated memory and interface arrangements, a printer 125 which may be a dot-matrix type and an indicator panel 130 which may include an LCD panel well known in the art. The display panel includes a display 131, a telephone activity unit 133, a keypad 135 and an operation key unit 137. While telephones 103-1 to 103-24 are shown in FIG. 1, it is to be understood that each line of lines 105-1 through 105-24 may be connected to a facsimile device, a modem or another type of communication device.

The switching center 101 is coupled to telephones 103-1 to 103-24 through lines 105-1 to 105-24, respectively, and inputs of line interfaces 110-1 to 110-24 are coupled to lines 105-1 to 105-24 through interface lines 107-1 to 107-24, respectively. Such coupling may include coupling through standard telephone connectors. Outputs of line interfaces 110-1 to 110-24 are coupled to inputs of the buffer 112 and an output of the buffer 112 is coupled an input of the processor 120 through a line. An output of the processor 120 is coupled to the display 131 of the indicator panel 130. The telephone line activity unit 133 is coupled through a line to the processor 120. The keypad 135 is coupled through another line to an input of the processor 120. the operation key unit 137 is coupled through another line to the processor 120 and the printer 125 is coupled to the processor 120 through yet another line.

Operation of the monitor system of FIG. 1 is initiated after it is turned on by depressing a date/time key 137-6 and entering the time information by setting the date and time with keys of the keypad 135. A time period for monitoring is then set using a period start/stop key 137-8 and keys of the key pad 135. After the monitoring period has been set, a set active lines key 137-7 is depressed and lines to be monitored are selected using the keypad 135. Subsequent to active line selection, selected line LEDs of line activity unit 133 display the lines being monitored.

During operation of the monitor apparatus of FIG. 1, the selected line interface circuits 110-1 to 110-24 detect and monitor the hook states of the lines connected thereto. As is well known in the art, the DC voltage between ring and tip conductors of a telephone line exceeds 40 volts when the line is on-hook. In a typical telephone system in the United States If a telephone or other communication device connected to the line goes off-hook, the voltage between ring and tip conductors decreases to less than 10 volts DC. During a ringing signal, the differential voltage between ring and tip alternates between the on-hook and off-hook voltages at a maximum rate of 5 Hz. Each line interface (e.g., interface 110-1) detects the hook state of the connected line (e.g. line 105-1) and converts the hook signal on the line to a corresponding hook-state logic signal as will be described. When a telephone (e.g., 103-1) is on-hook, a logic 1 signal is output from the corresponding line circuit. A logic 0 signal is obtained when a telephone is off-hook and alternating logic is and logic 0s are obtained when a line is in a ringing state. It is to be understood, however, that other types of interface circuits well known in the art may be used to generate the hook state signals where the line signaling arrangements differing from those described are employed.

The processor 120 in FIG. 1 is adapted to receive the hook state signals from the line interfaces 110-1 to 110-24 through buffer 112 and to periodically scan the hook state logic signals obtained from the line interfaces at a prescribed times (e.g. every 8 milliseconds). By comparing the present hook state logic signal with the immediately preceding hook state logic signal, a determination is made as to the line status. A count of the time that a line is off-hook and a count of hook state toggling are also maintained. When a line is on-hook, the hook count is zero and the toggle count is zero. An off-hook line scanned at 8 millisecond intervals provides a hook count of 125 every second. If a line is in a ringing state, the hook state will alternate every 8 milliseconds and a comparison between present and immediately preceding hook states provides a toggle count indicative of the ringing state.

As a result of the analysis in the processor 120 of the hook state, hook count and toggle count signals, the line status is determined as an incoming, an outgoing, a lost or a no-call. An incoming call is detected when a ring state is followed by an off-hook state. An outgoing call is detected when an on-hook state is followed by an off-hook state. A lost call is detected when a ring state is followed by an on-hook state and a no call state corresponds to a detected ring state. The no call state becomes an incoming call when the line goes off hook from the ring state and becomes a lost call when the line goes on hook from the ring state.

The processor 120, as will be described in greater detail, scans the outputs of the line interfaces 110-1 to 110-24 for hook states every 8 milliseconds and generates signals corresponding to the status of each active line as to incoming calls, outgoing calls, and lost calls and signals as to call holding time (i.e., duration of an incoming call) every second. The line status information is stored for a period set by operation of a period start/stop key 137-8 or a most recent period key 137-9 and keypad 135. The number of incoming, outgoing or lost calls or the average call holding time may be recalled from storage and displayed on the LCD display 131 by depressing the appropriate one of incoming calls key 137-1, outgoing calls key 137-2, lost calls key 137-3 or ave. hold key 137-5.

In addition to monitoring the status of each selected line, the circuit of FIG. 1 is also adapted to determine the estimated busy time corresponding to an estimate of blocked calls by monitoring the communication lines 105-1 through 105-24 and to set an alarm when a blocked call is expected. A blocked call corresponds to a call that cannot be completed because all lines are in a busy state. As is well known, it is not possible to detect a blocked call by line hook state monitoring since the call is blocked at a switching center prior to reaching the lines. The blocked call information is only available at the remotely located switching center 101. According to the invention, a signal corresponding to an accurate estimate of blocked calls is produced by determining a calling pattern of incoming calls solely from the monitored line hook states at the communication terminal. As a result, it is automatically determined when blocked calls are likely to occur in real time. The monitoring requires only coupling to the communication lines of the terminal and is non-invasive in avoiding special lines between the switching center and the terminal dedicated to determining blocked calls or other terminal conditions. The terminal operation may then be adjusted accordingly from the blocked call determination performed only at the terminal.

According to the invention, blocked incoming calls due to all lines of a communication system being busy is estimated by determining the average rate of incoming calls, determining the time interval in which all lines are busy (i.e., in use) and calculating an estimate of the number of blocked calls from the determined average incoming call rate and the time interval in which all lines are in use. The rate of incoming calls corresponds to a calling pattern and the time interval in which all lines are in use corresponds to a state in which all lines are busy.

In the illustrative embodiment shown in FIG. 1, a calling pattern signal is generated by detecting the times at which incoming calls are initiated over a prescribed time interval I and forming a call pattern signal TAV representing the average of the differences between initiation times (e.g. t1, t2, . . . , tn, . . , tN) of the N successive incoming calls in the interval I. When at a time TAOFF an all lines are busy state is detected as a result of scanning the active line interface circuits 110-1 to 110-24, a signal corresponding to a predetermined multiple of the average incoming call holding time over the preset monitoring period is generated from the line status signals stored in the processor 120 to provide the prescribed time interval. It is to be understood, however, that the prescribed time interval may be fixed period (e.g., 10 minutes) or determined according to other considerations.

Once the prescribed time interval signal I is generated, signals representing the differences between starting times of the successive incoming call (e.g., tn−tn−1) in the prescribed time period are produced in the processor 120 from stored line status signals. The call pattern signal TAV is formed according to the relationship $$TAV = \left[ \sum_{n=2}^{N} (tn - tn - 1) \right] / N \tag{1}$$

where N is the total number of incoming calls in the prescribed time interval and n corresponds to the nth successive incoming call in the prescribed time interval. An alarm signal may be set at a time TAOFF+TAV. It is to be understood, however, that other statistical parameters derived from the calling pattern may also be employed.

When a line going on-hook at a time TONH is detected, the state in which all lines are off-hook is terminated and an estimated blocked call signal EBC is generated in the processor 120 according to the relationship $$EBC = (TONH - TAOFF)/TAV \tag{2}$$

corresponding to the difference between the start and the termination times of the all lines busy state modified by the calling pattern signal. The estimated blocked call signal may be displayed on the LCD display 131 by depressing an estimated busy key 137-4 of the operation key unit 137. While an average of the initiation time differences for incoming calls is used in the illustrative embodiment shown in FIG. 1, it is to be understood that other signals representative of calling patterns for incoming calls may be utilized.

With respect to equation 2, the difference between the termination time TONH and the starting time TAOFF represents the blocking time and the call pattern signal is representative of the rate at which incoming calls occur just prior to the start of the blocking time. As is readily seen from equation 2, the number of blocked calls is proportional to the blocking time and inversely proportional to the rate of incoming calls. I have found that this relationship provides an accurate estimate of the number of blocked calls at a communication terminal and can be used with standard calculations to determine the number of additional lines required at the terminal to prevent blockage.

Advantageously and in accordance with the invention, the number of blocked calls is accurately estimated in real time by non-invasively monitoring only the hook states of the communication terminal lines and there is no need for additional lines from a switching center to the communication terminal to transmit information concerning blocked calls. As is well known in the art, the total traffic in the busy hour corresponds to the product of the average holding time, 0.6 CCS and sum of the number of incoming calls, the number of outgoing calls, the estimated number of blocked calls and the number of lost calls. The number of lines required to handle the call traffic load is the total traffic in CCS divided by 36. Consequently, line traffic management can be performed at the communication terminal without reference to blocked call information from the remote switching center.

The signal pattern signal TAV in the illustrative embodiment corresponding to the average difference between starting times of successive incoming calls represents the time at which the next incoming call is expected. Thus, according to one aspect of the invention, an alarm signal is generated after a time TAV subsequent to the initiation of a detected all lines busy state. According to this aspect of the invention, an automatic indication of blocked calls is provided so that the operation of the communication signal may be immediately adjusted.

Figure 2:
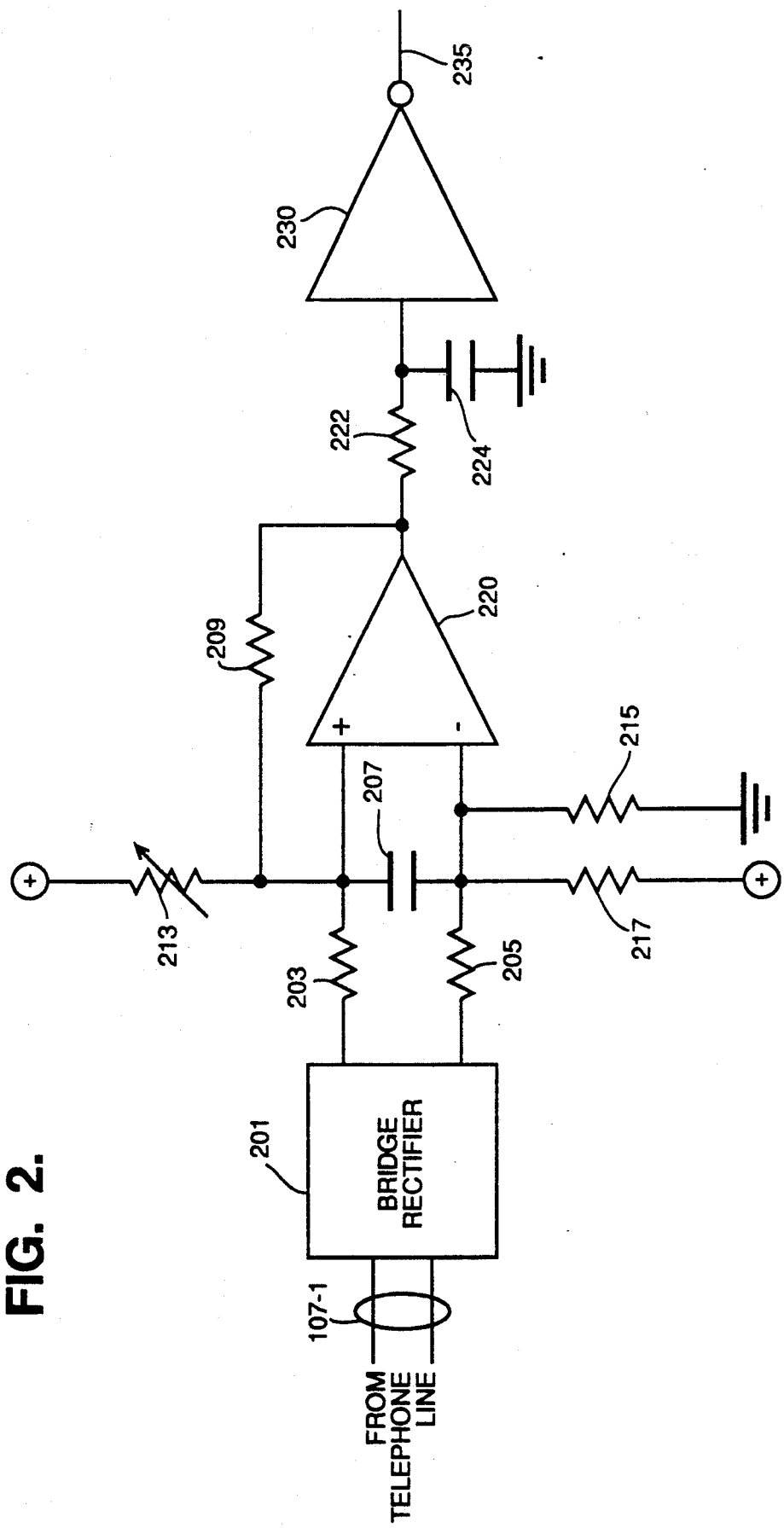
FIG. 2 is a schematic diagram of a line interface circuit useful in the embodiment of FIG. 1.

FIG. 2 depicts a more detailed block diagram of a line interface circuit (e.g. 110-1) of FIG. 1. Referring to FIG. 2, there is shown a portion of an interface line 107-1, a bridge rectifier 201 having a pair of inputs and a pair of outputs, a differential operational amplifier 220 having a positive input, a negative input and an output, a Schmidt trigger invertor 230 having an input and an output, a resistive-capacitive network including coupling resistors 203 and 205 and a capacitor 207, a voltage divider network including a variable resistor 213, a fixed resistor 215 and a fixed resistor 217, an operational amplifier feedback resistor 209 and a low pass filter including a resistor 222 and a capacitor 224.

The input terminal pair of the bridge rectifier 201 is coupled to the interface line 107-1. The resistor 203 is coupled between an output of the bridge rectifier 201 and the positive input of the operational amplifier 220 and the resistor 205 is coupled between another output of bridge rectifier 201 and the negative input of operational amplifier 220. The capacitor 207 is coupled between the positive input of amplifier 220 and the negative input of amplifier 220. A terminal of the variable resistor 213 is connected to a positive voltage terminal and another terminal of the resistor 213 is connected to the junction of the positive input of the amplifier 220 with the resistor 203.. A terminal of the resistor 209 is connected to the output of the amplifier 220 and another terminal of resistor 209 is connected to the input of the amplifier 220.

A terminal of the resistor 217 is connected to another positive voltage terminal and another terminal of the resistor 217 is connected to the negative input of the amplifier 220. A terminal of the resistor 215 is connected to the negative input of the amplifier 220 and another terminal of the resistor 215 is connected to a reference potential (e.g., ground). A terminal of the resistor 222 is connected to the output of the amplifier 220 and another terminal of the resistor 222 is connected to the input of the Schmidt trigger 230. A terminal of the capacitor 204 is connected to the input of the Schmidt trigger 230 and another terminal of the capacitor 204 is connected to the reference potential (e.g., ground). The output of the Schmidt trigger 230 is connected to a line 235.

In operation, the voltage on line 107-1 representative of the hook state of the communication line connected thereto is supplied to the input terminal pair of the bridge rectifier 201 and the rectified output from the bridge rectifier 201 is coupled by the resistive-capacitive network including resistors 203 and 205 and capacitor 207 to the positive and negative inputs of the amplifier 220. The use of the bridge rectifier permits connection of the interface circuits to communication lines with normal or reverse tip and ring connections. Voltage divider resistor 213 is adjusted to obtain a desired DC operating voltage for proper detection of on-hook and off-hook states by the Schmidt trigger invertor 230 and the values of the resistors 203, 205, 213, 215 and 217 are selected as is well known in the art to provide a high input impedance as required by FCC regulations.

The output of amplifier 220 corresponding to the hookstate of the monitored line is low pass filtered by the arrangement of the resistor 222 and the capacitor 224 to remove unwanted noise from the input of the Schmidt trigger invertor 230. The Schmidt trigger invertor 230 produces a logic signal corresponding to the hook state of the monitored line. The output of the Schmidt trigger invertor 203 is a logical 1 when the monitored line is on-hook and a logical 0 when the monitored line is off-hook. The output of the Schmidt trigger invertor 230 is an alternating logical 1 and a logical 0 when the line to which the interface circuit is connected is in a ringing state. The hook state logical signal at the output of Schmidt trigger invertor 230 is applied to an input of the buffer 112 in FIG. 1 via the line 235.

Figure 3:
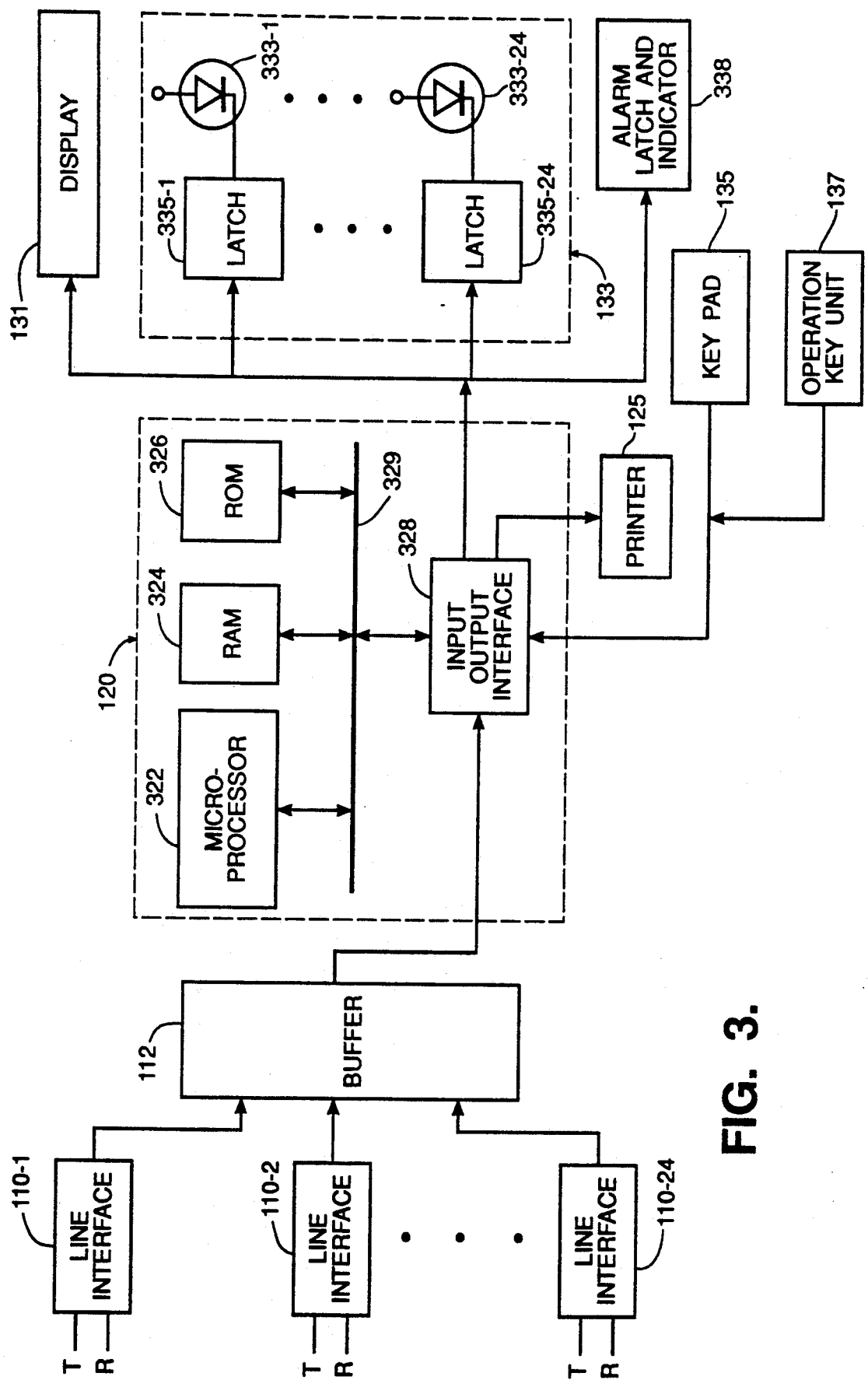
FIG. 3 is a more detailed block diagram of the embodiment depicted in FIG. 1.

FIG. 3 shows a more detailed block diagram of the processor 120 of FIG. 1 together with other circuits of FIG. 1. Referring to FIG. 3, there is shown line interfaces 110-1 to 110-24, the buffer 112, the printer 125, the LED display 131, the line activity unit 133, the keypad 135, the operation key unit 137, an alarm latch and indicator 338 and the processor 120. The processor 120 includes a microprocessor 322 which may be a Z-80 microprocessor or any other microprocessor adapted to perform the functions illustrated in the flow charts of FIGS. 4 through 8, a random access memory (RAM) 324 to store data, a read only memory (ROM) 326 to store control instruction signals, an input-output interface 328, and a bus 329.

As aforementioned with respect to FIG. 1, inputs of line interfaces 110-1 to 110-24 are coupled to the tip and ring conductors of communication lines 105-1 to 105-24 and are indicated as coupled to tip T and ring R conductors of communication terminal lines in FIG. 3. Outputs of line interfaces 110-1 to 110-24 are coupled to inputs of the buffer 112. The microprocessor 322, the RAM memory 324 and the input output interface 328 are coupled to the common bus 329 through bidirectional lines and the ROM 326 is coupled to the common bus 329 through a unidirectional line. The input-output interface 328 is coupled via a line to the printer 125, via lines to latches 335-1 through 335-24 of the line activity unit 133, via another line to display 131 and through yet another line to the alarm latch and indicator 338. Latches 335-1 to 335-24 are coupled through lines to LEDs 333-1 to 333-24, respectively.

The ROM 326 has stored therein instruction signals that control the operation of the processor 120. These instruction signals correspond to the operations shown in the flow charts of FIGS. 4–8 and are arranged to control the microprocessor 322, the RAM 324 and the input output interface 328 to carry out the operations illustrated in the flow charts of FIGS. 4–8.

Figure 4:
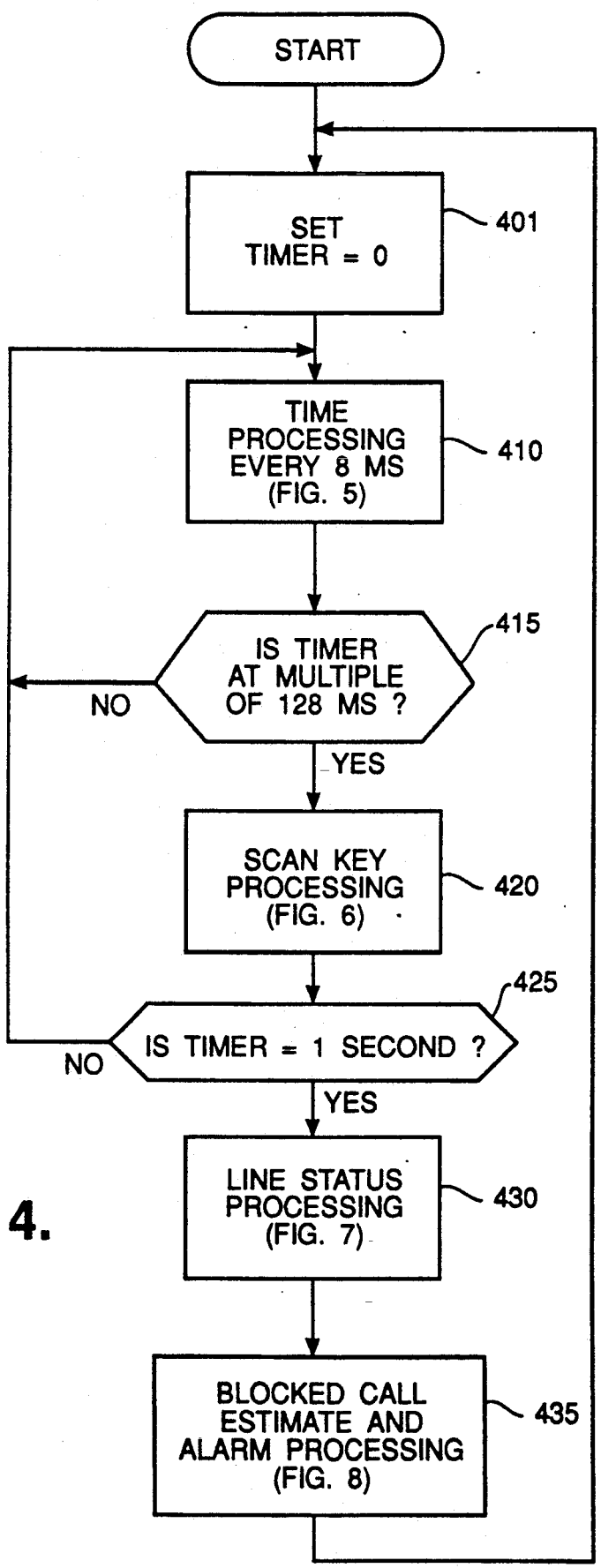
FIG. 4 is a flow chart illustrating the general operation of the embodiment depicted in FIG. 1.

FIG. 4 is a flow chart illustrating the general operation of the embodiment of the invention. Referring to the block diagram of FIG. 3 and the flow chart of FIG. 4, a timer signal is set initially set to zero in a step 401 and an operating loop including steps 410 through 435 is entered from the step 401 periodically at preset times (e.g., every 8 milliseconds). In step 410, timer processing is performed that includes scanning the active lines and updating the hook count and toggle count for each line based on the scanned hook states at the preset interrupts.

Figure 5:
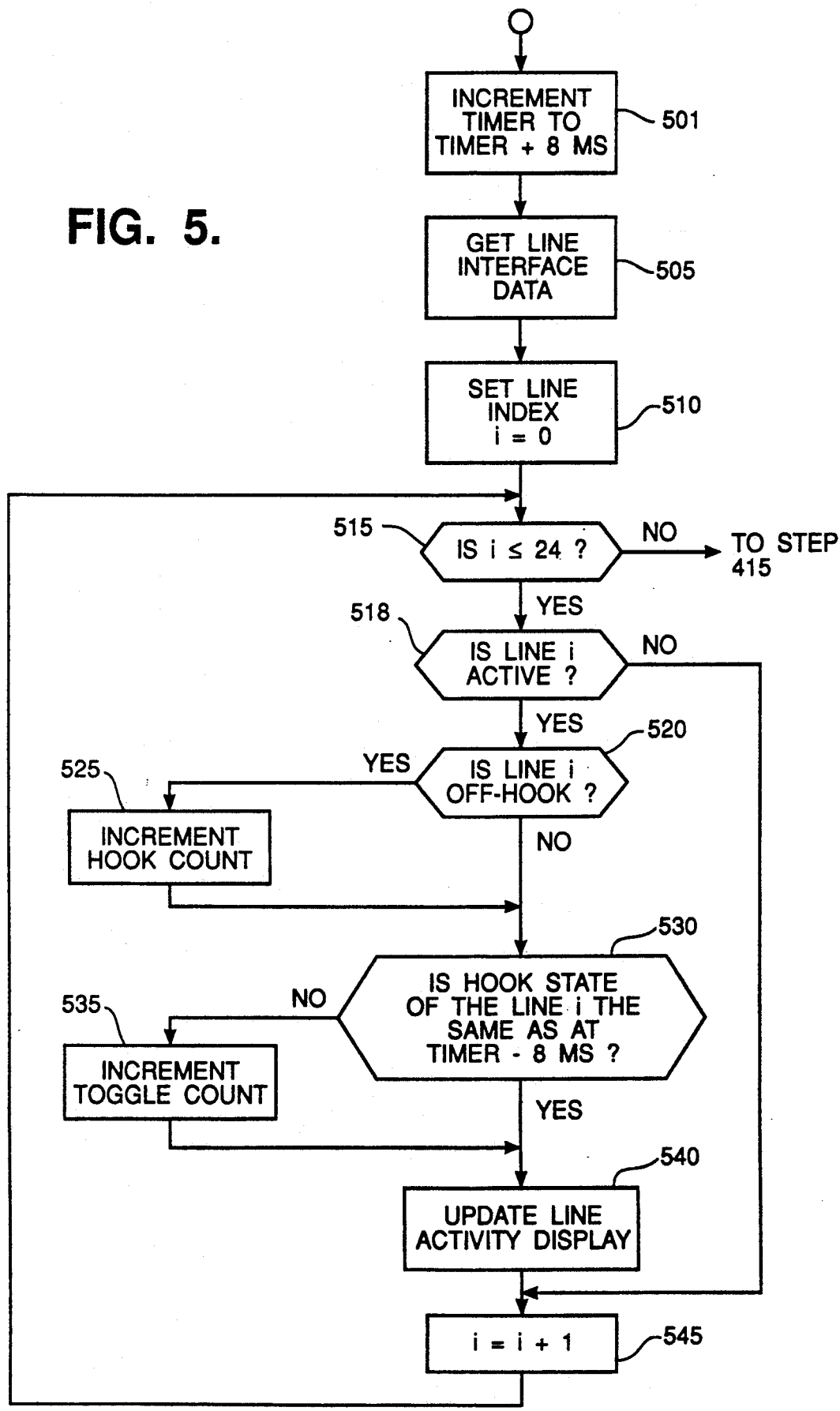
FIG. 5 is a more detailed flow chart illustrating the timer processing in the flow chart of FIG. 4.

The timer processing is shown in greater detail in the flow chart of FIG. 5. Referring to FIGS. 3 and 5, a step 501 is entered from the output of step 401 in FIG. 4 and the timer signal is incremented by 8 milliseconds. Control is passed to a step 505 in which hook state data obtained from line interfaces 110-1 to 110-24 through the buffer 112 and the interface 328 and stored in the RAM memory 324 is accessed by the microprocessor 322 in FIG. 3. Next, a line index i is set to zero in a step 510 and the loop from a step 515 to a step 545 is initially entered. In the decision step 515, the value of the line index i is checked to determine if all lines have been processed.

Until the index i is greater than 24, the lines are sequentially processed in the loop from step 515 to 545. In the timer processing illustrated in FIG. 5, the hook state logic signals from line interfaces 110-1 to 110-24 are transferred to the processor 120 via the buffer 112 and Whether or not line i is off-hook is determined in a decision step 520. If line i is off-hook, the hook count stored in RAM memory 324 for line i is incremented in the microprocessor 322 (step 525) and returned to the RAM memory 324. A decision step 530 is then entered. Otherwise, the decision step 530 is entered directly from the "NO" output of the decision step 520. The presently scanned hook state is compared to the hook state scanned in 8 milliseconds preceding the present scan in the decision step 530. If the present hook state is different from the preceding hook state indicating ringing, the toggle count stored in RAM memory 324 is incremented in a step 535.

A step 540 is then entered in which an LED corresponding to the line i is set to display the hook status of the line. When the line is determined to be off-hook in microprocessor 322, a signal from the microprocessor is sent to the corresponding line latch (e.g., latch 335-1 in FIG. 3) and an LED for the line (e.g., LED 333-1) is turned on. If the line is determined to be on-hook, the latch is reset and the LED for the line is turned off. After the display update in the step 540, the line index i is incremented in a step 545.

The operations of the loop from the step 515 to the step 545 are iteratively performed until the hook status, the hook count and the toggle count for each line is determined in the microprocessor 322 and stored in the RAM memory 324. When the line index i exceeds 24, control is returned to a decision step 415 in FIG. 4 from the "NO" output of step 515 and it is determined whether the timer signal value is a multiple of 128 milliseconds. Until the timer signal value reaches the next multiple of 128 milliseconds, the timer processing is repeated every 8 milliseconds as indicated in the step 410.

Figure 6:
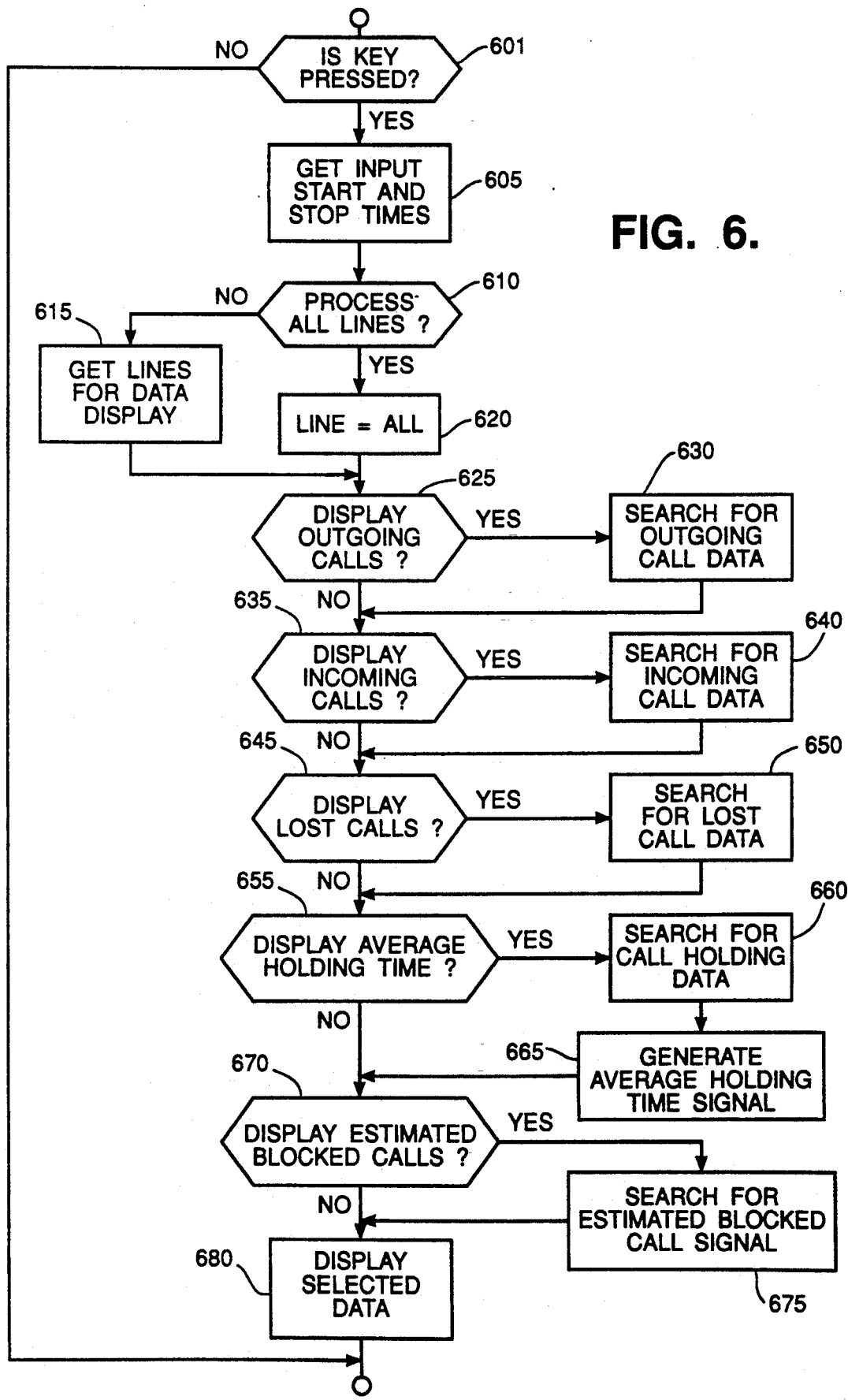
FIG. 6 is a more detailed flow chart illustrating the scan keys processing in the flow chart of FIG. 4.

Every 128 milliseconds, a step 420 is entered from the "YES" output of a decision step 415 in FIG. 4 and scan key processing shown in greater detail in FIG. 6 is performed. During the scan key processing of FIG. 6, communication parameters are selectively displayed for the preset monitoring period.

Referring to FIG. 6, a decision step 601 is entered from the step 415 of FIG. 4. In the decision step 601, the microprocessor 322 determines if a key of operation key unit 137 corresponding to a condition being monitored has been depressed. If no operation key has been depressed, control is passed back to decision step 425 in FIG. 4. Otherwise, the start and stop times of the monitoring period are obtained from RAM memory 324 in a step 605. It is determined whether all lines or selected lines are to be processed for display in a step 610. Depression of the * key causes a step 620 to be entered from the step 610 so that all lines are selected. In the absence of an * key signal, the active lines stored in the RAM memory 324 are selected. In either event, steps 625 to 680 are then sequentially operated to selectively display communication parameters.

If display of outgoing calls for the designated period is requested by depressing the outgoing calls key 137-2 in FIG. 1 (step 625), the microprocessor 322 searches the RAM memory 324 for outgoing call data and stores the result in the RAM memory 324 (step 630). When display of incoming calls is requested by depressing the incoming calls key 137-1 (step 635), incoming call data in RAM memory 324 is obtained and the resulting number of incoming calls is stored in the RAM memory 324 (step 640). Similarly, the number of lost calls in the prescribed period may be requested (step 645) and the number of lost calls for the period is totaled and stored in RAM memory 324 (step 650).

When the ave. hold key 137-5 is depressed, step 660 is entered from the decision step 655 in which call holding data is obtained for the prescribed period from the RAM memory 324. A signal representing the average call holding time for the period is then produced in the microprocessor 322 and stored in the RAM memory 324 (steps 660 and 665). The estimated number of blocked calls for the prescribed period stored in the RAM 324 may also be displayed by depressing the EST. BUSY key 137-4 to access the estimated blocked call signal stored in RAM 324 through steps 670 and 675. The selected data to be displayed is transferred from the RAM memory 324 to the display 131 as per step 680 and control is thereafter passed to the instruction signals stored for the decision step 425 in FIG. 4.

The decision step 425 normally returns the monitor operation to the timer processing step 410. Every second, the normal path is interrupted and a step 430 in which line status processing is performed to obtain line status parameters with a resolution of 1 second. The line status processing which includes detecting and recording information on incoming, outgoing and completed calls as well as call holding time and busy calls is shown in greater detail in the flow chart of FIG. 7.

Figure 7:
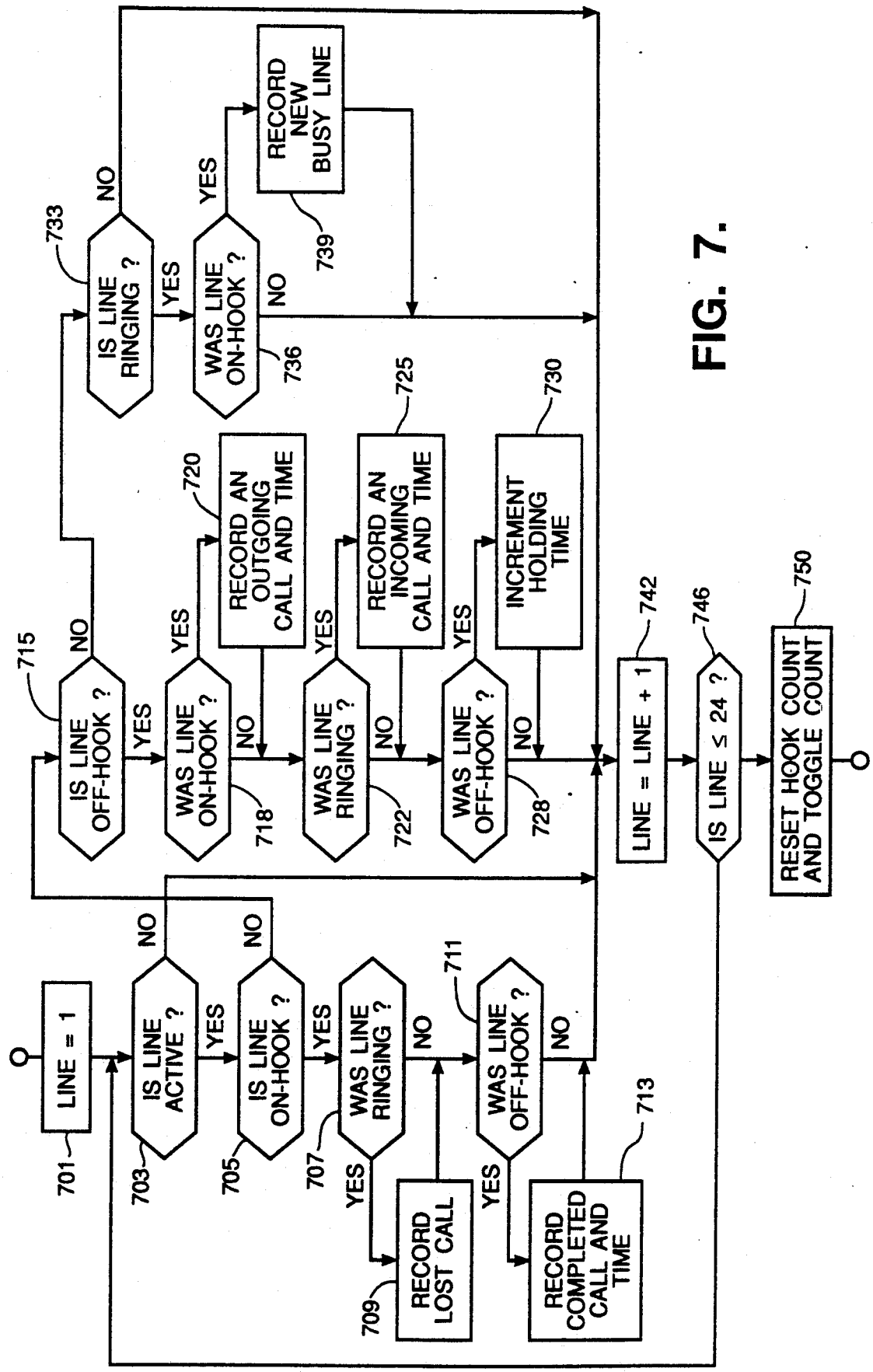
FIG. 7 is a more detailed flow chart illustrating the line status processing in the flow chart of FIG. 4.

Referring to FIG. 7, a step 701 is entered from the step 425 of FIG. 4 at intervals of one second (i.e., one second interrupt) and a line index is set to 1 to address hook related information for the addressed line stored in the RAM memory 324. Whether the currently addressed line is active is then determined in a decision step 703. If the addressed line is active, a check is made as to whether the line is on-hook in a step 705. When the addressed line is found to be on-hook, a check as to whether the line was in a ringing state at the previous one second interrupt is made in the microprocessor 322 from data in the RAM memory 324 (step 707). If the addressed line is now on-hook and was previously ringing, a lost call for the addressed line is recorded in the RAM memory 324 in a step 709. A decision step 711 is then entered in which it is determined if the addressed line was off-hook at the preceding one second interrupt. If the change from off-hook to on-hook status is determined in the microprocessor 322 (step 711), a completed call and the time of call completion is stored in the RAM memory 324 (step 713).

When an active line is determined as not on-hook in the step 705, control is transferred to stored instruction signals in ROM memory 326 corresponding to a decision step 715. In the step 715, whether the addressed line is off-hook is checked. When the addressed line is found to be off-hook, it is determined if the addressed line was on-hook at the preceding one second interrupt (step 718). A change from on-hook to off-hook status causes an outgoing call to be recorded in the RAM memory 326 in a step 720. If, however, the line was ringing at the preceding one second interrupt (step 722) and is now off-hook (step 715), an incoming call and its starting time are recorded for the addressed line in the RAM memory 324 (step 725). A decision step 728 is entered from either the decision step 722 or the step 725 and a check of whether the line was off-hook at the preceding one second interrupt is made. If a "YES" decision is made, the holding time is incremented and stored in the RAM memory 324 in a step 730.

In the event the addressed active line is determined not in the on-hook state in the step 703 and not in the off-hook state in the step 715, the addressed line is checked for ringing state status in a step 733. When found to be in the ringing state in the step 733, it is determined whether the addressed line was on-hook at the preceding one second interrupt. If so, a new busy line signal is generated in the microprocessor 322 and stored in the RAM memory 324. At the end of line status determination, a step 742 is entered from the step 711, 713, 728, 730, 736 or 739 in which the line number is incremented so that the line status processing can be performed for the succeeding line. Whether all lines have been processed is determined in a decision step 746. If not, the step 703 is reentered. After all lines have been processed according to the flow chart of FIG. 7, the hook count and toggle count signals are reset in a step 750. The instruction signals in ROM 326 then pass control to a step 435 of FIG. 4 wherein blocked calls are estimated blocked call and alarm processing are performed.

Figure 8:
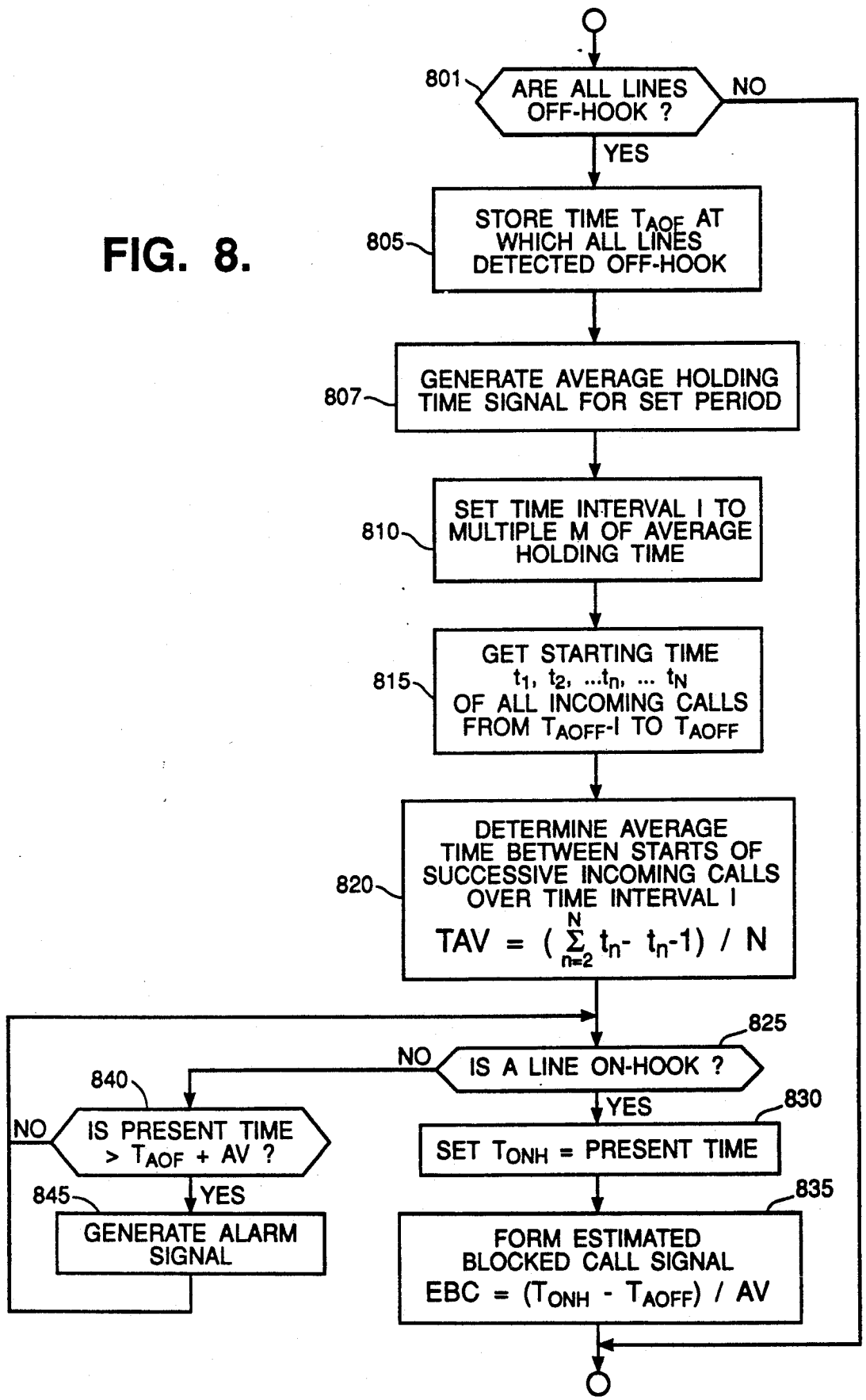
FIG. 8 is a more detailed flow chart illustrating the estimated blocked call processing and alarm signal forming operations of the flow chart of FIG. 4.

FIG. 8 is a flow chart showing the blocked call estimation and alarm processing in greater detail. Referring to FIG. 8, a decision step 801 is entered from the step 430 of FIG. 4 and the microprocessor 322 checks the data in RAM memory 324 to determine if all lines are off-hook. If not, the step 401 of FIG. 4 is reentered and the timer processing is restarted. When an all lines busy state is detected in the step 801, the starting time TAOFF of the all lines are busy state is stored in RAM memory 324 (step 805) and a signal corresponding to the average holding time for the presently set monitoring period is generated from the holding time information stored in RAM 324 (step 807). A prescribed time interval I corresponding to a multiple (e.g. 5) of the average holding time is then formed in a step 810.

Upon determination of the prescribed time interval I in the step 810, A step 815 is entered wherein the microprocessor retrieves the starting times of all incoming calls from RAM memory 324 for the prescribed time interval ending at the time TAOFF. The average signal TAV which represents the incoming call pattern is then formed according to equation 1 in step 820 and the hook state signals stored in the RAM memory 324 are scanned to determine if a line goes on-hook (step 825).

At each determination that all lines are off-hook in the step 825, a decision step 840 is entered to check whether the time TAV has elapsed from the time TAOFF at which the all lines busy state was detected. The time TAV corresponds to the time at which another incoming call is expected to start. Since all lines are off-hook, such an incoming call cannot be served and a "YES" decision in the step 840 causes an alarm signal to be generated in the microprocessor 322 (step 845). The alarm signal is sent to the latch and indicator 338. Step 825 is reentered from either step 840 or 845. Upon detection of a line going on-hook in the step 830, the time TONH at which the line goes on-hook is set and an estimated blocked call signal is generated according to equation 2 in a step 835.

Assume, for purposes of illustration of the formation of the estimated blocked call signal, that lines 105-1 to 105-5 are active in the monitor arrangement of FIG. 1, the average holding time of a call is 74 seconds, and the all lines are busy state is initiated at a time 10:05:12. A prescribed time interval I is set to 370 seconds (step 810) corresponding to five times the average holding time. Further assume that the starting times of all calls in the 370 seconds just prior to the time tAOFF=10:05:12 are t1=10:02:16, t2=10:03:40, t3=10:04:10, t4=10:04:15, t5=10:04:18 and t6=10:05:12. The time between the start of the first and second incoming calls is t2−t1=84 seconds. The time between the start of the second and third calls is t3−t2=30 seconds. The time between the start of the third and fourth calls is t4−t3=5 seconds and the time between the start of the fourth and fifth calls is t5−t4=3 seconds.

As a result of the determination in the step 820, the average time between incoming call starts over the prescribed time interval of 370 seconds is TAV=30.5 seconds according to equation 1. An alarm signal is generated in the step 845 at time 10:05:43 to indicate that a blocked call is estimated to have occurred. If one of the lines 105-1 to 105-5 goes on hook at time TONH=10:06:50, the duration of the all lines are busy state is 98 seconds and the estimated blocked calls signal determined from equation 2 is 3.2.

In accordance with the invention, the number of blocked calls is automatically determined in real time and an alarm is generated when a blocked call is expected by monitoring hook states of the lines of a communication terminal.

It is to be understood that the specific embodiment described herein is merely illustrative of the spirit and scope of the invention. Modifications can readily be made by those skilled in the art in accordance with the principles of the invention.

What is claimed is:

1. A communication system having one or more communication lines comprising:
    means for detecting times of incoming calls on at least one of the one or more communication lines;

means responsive to the detected times of the incoming calls for generating a signal corresponding to a calling pattern of incoming calls;

means for detecting a time at which a state in which all communication lines are busy is initiated; and means responsive to the detected initiation time of the all communication lines busy state and the calling pattern signal for forming a signal representative of blocked incoming calls.

2. A communication system according to claim 1, wherein the means for detecting the times of the incoming calls comprises:

means for determining a prescribed time interval; and means for detecting the times of the incoming calls in the prescribed time interval.

3. A communication system according to claim 2, wherein the means for determining the prescribed time interval comprises:

means for generating a signal corresponding to an average holding time of the incoming calls; and means responsive to the average holding time of the incoming calls for setting the prescribed time interval.

4. A communication system according to claim 3, wherein the prescribed time interval is set to a predetermined multiple of the average holding time of the incoming calls.

5. A communication system according to claim 2, wherein the means for detecting the times of the incoming calls comprises means for detecting the times at which the incoming calls are initiated in the prescribed time interval.

6. A communication system according to claim 5, wherein the means for generating the calling pattern signal comprises means for forming a signal corresponding to the differences in initiation times of the successive incoming calls in the prescribed time interval.

7. A communication system according to claim 6, wherein the calling pattern signal generating means further comprising means responsive to the initiation time differences signal for generating a signal representative of a statistical parameter of the initiation time differences in the prescribed time interval.

8. A communication system according to claim 7, wherein the statistical parameter signal is an average of the initiation time differences in the prescribed time interval.

9. A communication system according to claim 1 further comprising:

means for detecting a time at which the all communication lines busy state is terminated; and the blocked incoming calls signal forming means comprises means responsive to the difference between the initiation and termination times of the all communication lines busy state and the calling pattern signal for generating a signal corresponding to a number of the blocked calls.

10. A communication system according to claim 9, wherein the number of blocked call signal generating means comprises means for forming a signal representing the difference between the initiation and termination times of the all communication lines busy state divided by the calling pattern signal.

11. A communication system according to claim 10, wherein the means for detecting the times of the incoming calls comprises:

means for determining a prescribed time interval; and means for detecting the times of the incoming calls in the prescribed time interval.

12. A communication system according to claim 11, wherein the means for detecting the times of the incoming calls in the prescribed time interval comprises means for detecting the times at which the incoming calls are initiated in the prescribed time interval.

13. A communication system according to claim 12, wherein the means for generating the calling pattern signal comprises means for forming a signal corresponding to the differences in the detected initiation times of successive ones of the incoming calls in the prescribed time interval.

14. A communication system according to claim 13, wherein the means for forming the initiation time differences signal comprises means for forming a signal representative of an average of the initiation time differences in the prescribed time interval.

15. A communication system according to claim 1, further comprising means coupled to the one or more communication lines for generating line status signals, and wherein the means for detecting the initiation time of the state in which all communication lines are busy and the incoming call time detecting means are responsive solely to the generated line status signals.

16. A communication system having one or more communication lines comprising:

means for detecting times of incoming calls on at least one of the one or more communication lines;

means responsive to the detected times of the incoming calls for generating a signal corresponding to a calling pattern of incoming calls;

means for detecting a time at which a state in which all communication lines are busy is initiated; and means responsive to the detected initiation time of the all communication lines busy state and the calling pattern signal for forming a signal representative of a time of occurrence of a blocked call.

17. A communication system according to claim 16, wherein the means for detecting the times of the incoming calls comprises:

means for determining a prescribed time interval; and means for detecting the times of incoming calls in the prescribed time interval.

18. A communication system according to claim 17, wherein the means for detecting the times of the incoming calls comprises means for detecting the times that incoming calls are initiated in the prescribed time interval.

19. A communication system according to claim 18, wherein the means for generating the calling pattern signal comprises means for forming a signal corresponding to differences in initiation times of the successive incoming calls in the prescribed time interval.

20. A communication system according to claim 19 further comprising means responsive to the initiation time differences signal for generating a signal representative of a statistical parameter of the initiation time differences in the prescribed time interval.

21. A communication system according to claim 20, wherein the statistical parameter signal is an average of the initiation time differences in the prescribed time interval.

22. A communication system according to claim 20, wherein the means for forming the signal representative of the time of occurrence of a blocked call comprises means for generating a signal at a time corresponding to the average of the initiation time differences in the prescribed time interval after the detected initiation of the all communication lines busy state.

23. A communication system according to claim 16, wherein the means for forming a signal representative of the time of occurrence of a blocked call comprises means for generating a signal at a time corresponding to a value of the calling pattern signal after the detected initiation of the all communication lines busy state.

24. A communication system according to claim 16, further comprising means coupled to the one or more communication lines for generating line status signals, and wherein the means for detecting the initiation time of the state in which all communication lines are busy and the incoming call time detecting means are responsive solely to the generated line status signals.

25. A method for monitoring a communication system having one or more one communication lines comprising the steps of:
   detecting times of incoming calls on at least one of the one or more communication lines;
   generating a signal corresponding to a calling pattern of incoming calls responsive to the detected times of the incoming calls;
   detecting a time at which a state in which all communication lines are busy is initiated; and
   forming a signal representative of blocked incoming calls responsive to the detected initiation time of the all communication lines busy state and the calling pattern signal.

26. A method according to claim 25, wherein the step of detecting the times of the incoming calls comprises:
   determining a prescribed time interval; and
   detecting the times of incoming calls in the prescribed time interval.

27. A method according to claim 26, wherein the step of determining the prescribed time interval comprises:
   generating a signal corresponding to an average holding time of the incoming calls; and
   setting the prescribed time interval responsive to the average holding time of the incoming calls.

28. A method according to claim 27, wherein the prescribed time interval is set to a predetermined multiple of the average holding time of the incoming calls.

29. A method according to claim 26, wherein the step of detecting the times of the incoming calls comprises detecting the times at which incoming calls are initiated in the prescribed time interval.

30. A method according to claim 29, wherein the step of generating the calling pattern signal comprises forming a signal corresponding to differences in initiation times of the successive incoming calls in the prescribed time interval.

31. A method according to claim 30 further comprising the step of generating a signal representative of a statistical parameter of the initiation time differences in the prescribed time interval responsive to the initiation time differences signal.

32. A method according to claim 31, wherein the statistical parameter signal is an average of the initiation time differences in the prescribed time interval.

33. A method according to claim 25, further comprising the step of detecting a time at which the all communication lines busy state is terminated, and the forming of the blocked incoming calls signal comprises generating a signal corresponding to a number of the blocked calls responsive to the difference between the initiation and termination times of the all communication lines busy state and the calling pattern signal.

34. A method according to claim 33, wherein the step of generating the number of blocked calls signal comprises forming a signal representing the difference between the initiation and termination times of the all communication lines busy state divided by the calling pattern signal.

35. A method according to claim 34, wherein the step of detecting the times of the incoming calls comprises:
   determining a prescribed time interval; and
   detecting the times of the incoming calls in the prescribed time interval.

36. A method according to claim 34, wherein the step of detecting the times of the incoming calls in the prescribed time interval comprises detecting the times at which the incoming calls are initiated in the prescribed time interval.

37. A method according to claim 36, wherein the step of generating the calling pattern signal comprises forming a signal corresponding to the differences in the detected initiation times of successive ones of the incoming calls in the prescribed time interval.

38. A method according to claim 37, wherein the step of forming the initiation time differences signal comprises forming a signal representative of an average of the initiation time differences in the prescribed time interval.

39. A method according to claim 25, further comprising the step of generating line status signals by coupling to the communication lines, and wherein the detecting the initiation time of the state in which all communication lines are busy and the incoming call time detecting are responsive solely to the generated line status signals.

40. A method for monitoring a communication system having one or more communication lines comprising the steps of:
   detecting times of incoming calls on at least one of the one or more communication lines;
   generating a signal corresponding to a calling pattern of incoming calls responsive to the detected times of the incoming calls;
   detecting a time at which a state in which all communication lines are busy is initiated; and
   forming a signal representative of a time of occurrence of a blocked call responsive to the detected initiation time of the all communication lines busy state and the calling pattern signal.

41. A method according to claim 40, wherein the step of detecting the times of the incoming calls comprises:
   determining a prescribed time interval; and
   detecting the times of the incoming calls in the prescribed time interval.

42. A method according to claim 41, wherein the step of detecting the times of the incoming calls comprises detecting the times at which the incoming calls are initiated in the prescribed time interval.

43. A method according to claim 42, wherein the step of generating the calling pattern signal comprises forming a signal corresponding to the differences in initiation times of the successive incoming calls in the prescribed time interval.

44. A method according to claim 43, wherein the step of generating the calling pattern signal further comprising the step of generating a signal representative of a statistical parameter of the initiation time differences in the prescribed time interval responsive to the initiation time differences signal.

45. A method according to claim 44, wherein the statistical parameter signal is an average of the initiation time differences in the prescribed time interval.

46. A method according to claim 45, wherein the step of forming the signal representative of the time of occurrence of a blocked call comprises generating a signal at a time corresponding to the average of the initiation times differences in the prescribed time interval after the detected initiation of the all communication lines busy state.

47. A method according to claim 40, wherein the step of forming the signal representative of the time of occurrence of a blocked call comprises generating a signal at a time corresponding to a value of the calling pattern signal after the detected initiation of the all communication lines busy state.

48. A method according to claim 40, further comprising the step of generating line status signals by coupling to the communication lines, and wherein the detecting of the initiation time of the state in which all communication lines are busy and the incoming call time detecting are responsive solely to the generated line status signals.

49. A method for estimating incoming calls blocked as a result of all lines of a communication system being busy comprising the steps of:

determining the rate of incoming calls;

determining a time interval in which all lines are in use; and forming an estimate of blocked calls during the time interval in which all lines are in use responsive to the determined time interval and the incoming call rate.

50. A method according to claim 49, wherein the incoming call rate determining step comprises determining the rate of incoming calls in a time period prior to a starting time of all lines being in use.

51. A method according to claim 50, wherein the step of determining the rate of incoming calls in the time period prior to the starting of all lines being in use comprises forming a signal representative of the differences in starting times of successive incoming calls in the time period and generating a signal corresponding to the average starting time difference in the time period.

52. A method according to claim 50, wherein the step of determining the incoming call rate in the time period comprises forming a signal representative of the average incoming call rate in a prescribed time period just preceding the start of the time interval in which all lines are in use.

53. A method according to claim 52, wherein the step of forming an estimate of blocked calls comprises dividing the time interval in which all lines are in use by the average incoming call rate.

* * * * *

UNITED STATES PATENT AND TRADEMARK OFFICE
CERTIFICATE OF CORRECTION

PATENT NO. : 5,230,017

DATED : July 20, 1993

INVENTOR(S) : ROBERT C. ALEXANDER          Page 1 of 4

It is certified that error appears in the above-identified patent and that said Letters Patent is hereby corrected as shown below:

Title page, item [56] REFERENCES CITED

U.S. Patent Documents, insert
```
--3,636,259  1/72   Karras ..................... 179/8A
  4,250,354  2/81   Karras ..................... 179/8A
  4,270,024  5/81   Theis et al. ............... 179/8A
  4,408,100  10/83  George E. Pritz ............ 179/27
  4,712,230  12/87  Rice et al. ................ 379/112--.
```

Insert, Foreign Patent Documents,
```
--1-162055  6/89    Japan ........................
  1-192162  11/82   Soviet ......................--.
```
Drawings:

SHEET 8 OF 8

FIG. 8, Block 805, "$T_{AOF}$" should read --TAOFF--.
Block 840, "> $T_{AOF}$ + AV ?" should read
--> TAOF + AV ?--.

COLUMN 2

Line 24, "block" should read --blocked--.
Line 51, "difference" should read --differences--.

COLUMN 3

Line 29, "invention." should read --invention;--.
Line 60, "circuits 110" shuld read --circuits 110-1--.

UNITED STATES PATENT AND TRADEMARK OFFICE
CERTIFICATE OF CORRECTION

PATENT NO. : 5,230,017
DATED : July 20, 1993
INVENTOR(S) : ROBERT C. ALEXANDER

It is certified that error appears in the above-identified patent and that said Letters Patent is hereby corrected as shown below:

COLUMN 4

Line 17, "the" (second occurrence) should read --The--.
Line 38, "States If" should read --States, if--.
Line 51, "logic is" should read --logic 1s--.
Line 61, "a" should be deleted.

COLUMN 5

Line 9, "no-call." should read --no call.--.
Line 13, "no call" should read --no-call--.
Line 14, "no call" should read --no-call--.

COLUMN 6

Line 15, "fixed" should read --a fixed--.
Line 21, "tn—tn—1)" should read --tn—tn-1--.
Line 27, "(tn—tn—)" should read --tn—tn-1--.

COLUMN 7

Line 49, "terminal" should read --terminal,--.
Line 52, "resistor 203.." should read --resistor 203.--.
Line 57, "terminal and" should read --terminal, and--.

UNITED STATES PATENT AND TRADEMARK OFFICE
CERTIFICATE OF CORRECTION

PATENT NO. : 5,230,017
DATED : July 20, 1993
INVENTOR(S) : ROBERT C. ALEXANDER    Page 3 of 4

It is certified that error appears in the above-identified patent and that said Letters Patent is hereby corrected as shown below:

COLUMN 8

Line 6, "rectifier 201" should read --rectifier 201,--.
Line 37, "is" should read --are--.
Line 56, "input output" should read --input-output--.

COLUMN 9

Line 34, "Whether" should read --whether--.

COLUMN 12

Line 34, "tAOFF" should read --TAOFF--.

COLUMN 14

Line 19, "claim i," should read --claim 1--.

UNITED STATES PATENT AND TRADEMARK OFFICE
CERTIFICATE OF CORRECTION

PATENT NO. : 5,230,017
DATED : July 20, 1993
INVENTOR(S) : ROBERT C. ALEXANDER          Page 4 of 4

It is certified that error appears in the above-identified patent and that said Letters Patent is hereby corrected as shown below:

COLUMN 17

Line 8, "times" should read --time--.

Signed and Sealed this

Twenty-sixth Day of April, 1994

Attest:

BRUCE LEHMAN

Attesting Officer    Commissioner of Patents and Trademarks